United States Patent
Buschmann et al.

(10) Patent No.: US 9,156,619 B2
(45) Date of Patent: Oct. 13, 2015

(54) BELT CONVEYOR DEVICE

(75) Inventors: Martin Buschmann, Neustadt (DE);
Steffen Fickeisen, Bad Durkheim (DE);
Andreas Letz, Mannheim (DE);
Joschka Neumann, Mannheim (DE)

(73) Assignee: JOSEPH VOGELE AG, Ludwigshafen/Rhein (DE)

(*) Notice: Subject to any disclaimer, the term of this patent is extended or adjusted under 35 U.S.C. 154(b) by 10 days.

(21) Appl. No.: 13/640,536

(22) PCT Filed: Apr. 15, 2011

(86) PCT No.: PCT/EP2011/001936
§ 371 (c)(1),
(2), (4) Date: Dec. 28, 2012

(87) PCT Pub. No.: WO2011/128112
PCT Pub. Date: Oct. 20, 2011

(65) Prior Publication Data
US 2013/0092512 A1 Apr. 18, 2013

(30) Foreign Application Priority Data
Apr. 16, 2010 (EP) .................................. 10004062

(51) Int. Cl.
*B65G 39/10* (2006.01)
*B65G 15/60* (2006.01)
(Continued)

(52) U.S. Cl.
CPC ................ *B65G 15/60* (2013.01); *B65G 23/44* (2013.01); *B65G 39/16* (2013.01); *B65G 2201/045* (2013.01)

(58) Field of Classification Search
CPC .................................. B65G 39/16; B65G 23/44
USPC ........ 198/806, 807, 810.03, 810.04, 813–816
See application file for complete search history.

(56) References Cited

U.S. PATENT DOCUMENTS

| 2,914,957 A | 12/1959 | Leland |
| 3,545,599 A * | 12/1970 | Barber et al. .................. 198/807 |

(Continued)

FOREIGN PATENT DOCUMENTS

| CN | 2748416 Y | 12/2005 |
| DE | 697 06 861 T2 | 9/2001 |

(Continued)

OTHER PUBLICATIONS

The International Preliminary Report on Patentability mailed Oct. 16, 2012, which issued in corresponding International Application No. PCT/EP2011/001936.

(Continued)

*Primary Examiner* — William R Harp
(74) *Attorney, Agent, or Firm* — Fish & Richardson P.C.

(57) ABSTRACT

A belt conveyor for a road-finishing machine or a charger. The belt conveyor includes a conveyor belt in which a displaceably mounted support element abuts the conveyor belt, and a first and a second piston cylinder unit operate to displace the support element. The first and the second hydraulic piston cylinder units can be pressurised independently of each other in order to move the support element into a desired inclined position. If the conveyor belt of the belt conveyor runs laterally away from the support element, the out-of-true running of the conveyor belt can be counteracted by an inclined position of the support element which moves the conveyor belt back into its original position.

13 Claims, 1 Drawing Sheet

(51) Int. Cl.
  *B65G 23/44* (2006.01)
  *B65G 39/16* (2006.01)

(56) References Cited

U.S. PATENT DOCUMENTS

| | | | | |
|---|---|---|---|---|
| 3,897,640 | A | * | 8/1975 | Swisher et al. ............... 37/382 |
| 4,173,904 | A | * | 11/1979 | Repetto ......................... 474/104 |
| 4,354,595 | A | * | 10/1982 | Reynolds ....................... 198/807 |
| 4,860,634 | A | * | 8/1989 | Hein ............................. 91/363 R |
| 5,503,265 | A | * | 4/1996 | Hussar et al. ................. 198/807 |
| 5,733,214 | A | * | 3/1998 | Shiki et al. .................... 474/69 |
| 5,899,321 | A | * | 5/1999 | El-Ibiary ....................... 198/807 |
| 2003/0045966 | A1 | | 3/2003 | Ubaldi |

FOREIGN PATENT DOCUMENTS

| | | |
|---|---|---|
| DE | 202 10 624 U1 | 11/2003 |
| DE | 20210626 U1 | 12/2003 |
| EP | 870870 A2 | 10/1998 |
| JP | 60242111 A | 12/1985 |
| JP | H03-216412 A | 9/1991 |
| JP | 3125722 U | 12/1991 |
| JP | 2001-315110 A | 11/2001 |
| JP | 2002-080120 A | 3/2002 |
| JP | 2003-327317 A | 11/2003 |

OTHER PUBLICATIONS

European Search Report mailed May 27, 2011, which issued in corresponding International Application No. PCT/EP2011/001936.
A European Office Action dated May 14, 2012, which issued in corresponding European Application No. 10 004 062.5.
A European Search Report dated Oct. 5, 2010, which issued in corresponding European Application No. 10004062.5.
English translation of Japanese Office Action dated Dec. 26, 2013 which issued in corresponding Japanese Application No. 2013-504169.
English translation of office action which issued on Feb. 8, 2014 in corresponding Chinese Application No. 2011800194374.

* cited by examiner

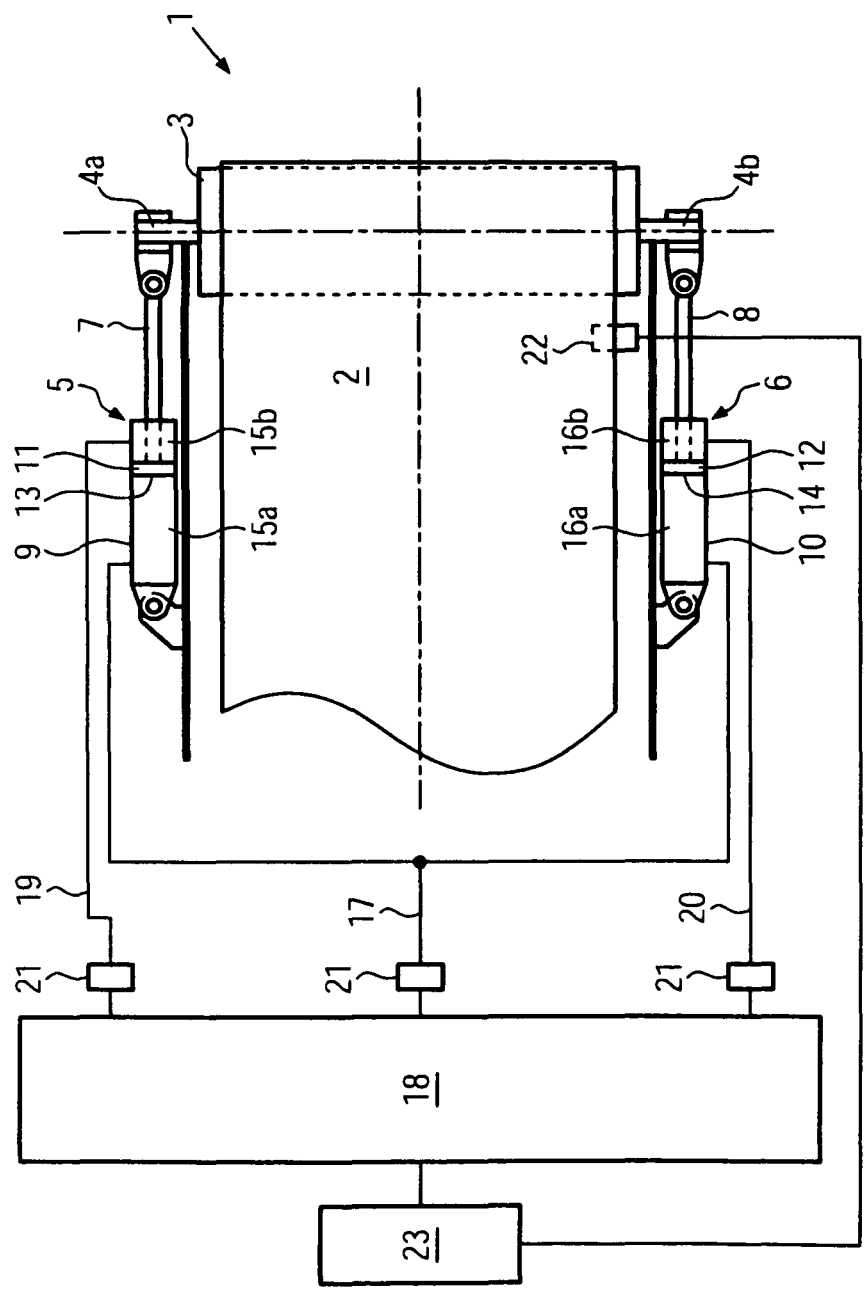

BELT CONVEYOR DEVICE

CROSS REFERENCE TO PRIOR APPLICATIONS

This is a U.S. National Phase application under 35 U.S.C. §371 of International Patent Application No. PCT/EP/2011/001936, filed Apr. 15, 2011, and claims the priority of European Patent Application No. 10004062.5, filed Apr. 16, 2010 both of which are incorporated by reference herein in their entirety. The International Application published in German on Oct. 20, 2011 as WO 2011/128112 under PCT Article 21(2).

FIELD OF THE INVENTION

The invention relates to a conveyor belt for a road finisher or a charger.

BACKGROUND OF THE INVENTION

In practice conveyor belts are used for conveying a viscous mix such as a bituminous or concrete mix or also sand or gravel. For road finishers or chargers conveyor belts are particularly useful for transporting the mix from a material bunker to a screed. Conveyor belts, which are installed in chargers or road finishers, are difficult to access which in turn leads to high maintenance costs. In addition the conveyor belts must be regularly checked before starting work to ensure that sufficient conveyor belt tension is available or that the belt runs in the appropriate direction so that no damage to the conveyor belt system can occur.

Known conveyor systems are mechanically tensioned by a threaded spindle. A threaded spindle can be fitted to the right and left near the driving drum, whereby the setting of the threaded spindle is set manually before the conveyor system starts up. A manual adjustment method of this nature can also influence the running of the belt. If it is found during the work, that the belt run has changed, a manual readjustment has to be made on the threaded spindle. In addition, one problem is that the road finisher or charger must be stopped, because correction during operation is not possible. Often it may happen that incorrect running of the conveyor belt is not noticed quickly enough. Then it may be that the conveyor belt runs out of true over the guide rollers and then rubs on the conveyor belt frame. With incorrect running of this nature, in which the conveyor belt rubs on the frame, damage to the belt may result. Similarly, the manual setting of the threaded spindle requires a certain routine which may be different depending on the person who makes the adjustment.

DE 697 06 861 T2 describes a mechanical conveyor-track guide arrangement for controlling the running of conveyor belts. The belt-steering arrangement consists of a steering bearer with two steering rollers to guide a conveyor belt when it runs in its transport direction. Here, the steering bearer can rotate or swivel about a first point of rotation which is located on a beam or girder. In addition the belt steering arrangement consists of a guide bearer with guide rollers which are arranged to abut on each of the outer sides of the belt. In this way a sideward displacement of the conveyor belt can be prevented. A disadvantage here is that with contact with the guide rollers a certain frictional wear arises on the conveyor belt and due to the increased running resistance a higher drive energy is required.

US 2003/0045966 A1 relates to a moving belt arrangement for the automatic centring of the conveyor belt. Here, the run of the belt is monitored by means of sensors, whereby an unwanted running direction can be detected in order to change the setting of a drive roller such that the running belt runs back to its original position. To check the running of the belt a magnetic element is integrated into the belt which is monitored by a sensor arrangement. However, conveyor belts in road construction are subjected to high thermal stresses and must withstand high tensile stresses due to the heavy mix to be transported. Therefore it is extremely questionable whether a running belt arrangement as described by US 2003/0045966 A1 is suitable for application in road construction.

DE 202 10 624 U1 describes a tensioning device for conveyor belts. Here, a drive roller is tensioned at both ends by two hydraulic cylinders. The tension of the conveyor belt can be monitored by means of sensors, whereby the hydraulic tensioning system is activated when the tension is insufficient. Here, firstly a differential cylinder is subjected to pressure, which simultaneously propagates to the second differential cylinder through a pressure line, whereby simultaneous displacement occurs at both ends of the drive roller to evenly tension the belt.

SUMMARY OF THE INVENTION

The object of the invention is to provide an automatic tensioning and belt-running control for a conveyor belt, which can be used in particular with chargers and road finishers in road construction.

This object is solved by the belt conveyor device of the present invention.

The invention relates to a belt conveyor device for a road finisher or charger with a conveyor belt, to which a displaceably supported support element abuts, and with a first and a second piston cylinder unit for displacing the support element, whereby in particular the first and the second piston cylinder units can be pressurised independently of each other to move the support element into a desired inclined position.

Preferably, hydraulic cylinders are used to displace the heavily loaded support element, by means of which the conveyor belt is influenced and adequately tensioned in its run. Here, the applied pressure can be variably and automatically controlled by hydraulic valves. The tension force acting on the conveyor belt can be automatically varied during operation. In comparison to manual adjustment or correction of the conveyor belt tension much time can be saved in this way and also injury to the person making the adjustment is prevented.

The independent application of pressure to the piston cylinder units leads to a displacement of the support element, by means of which an undesired run of the conveyor belt can be counteracted to return the conveyor belt to a desired running direction. The belt conveyor device is able to counteract dynamic skew of the belt before the belt runs so far from the central position that damage to the belt can occur. In addition, the control of the belt run can occur independently of various external influences, such as for example an inclined position of the belt system or soiling of the driving drum. Similarly, due to the independent pressure control of the individual hydraulic cylinders the tension force acting on the conveyor belt can be maintained constant during the belt running control. Although the belt conveyor device according to the invention is subjected to high stresses due to heavy conveyed material, the belt or its run can be precisely tensioned or controlled with a quick response by the hydraulic device.

In an expedient embodiment the first and the second piston cylinder units engage at the side adjacent to the support element. In this way the support element can be supported in a particularly stable manner.

Preferably, the piston cylinder units can be pressurised on both sides. The piston cylinder units are here similar to a differential cylinder, whereby adjustment of the support element with a quick response is ensured.

The piston cylinder units can each comprise a cylinder which is supported fixed on the conveyor belt frame. Alternatively, the cylinder can also be mounted on the frame of the charger or road finisher to prevent vibrations from the conveyor belt frame being transferred to the cylinder.

Preferably, the cylinder comprises cylinder chambers which are suitable for accommodating hydraulic pressures. Here, the cylinder chambers can vary their volumes.

In an expedient embodiment the cylinder chambers are connected to a pressure source by a controllable pressure line. Transfer of hydraulic forces by the hydraulic fluid is in this way particularly feasible.

Preferably, the pressure in the cylinder chambers can be controlled variably and independently of each other by an electrically actuated hydraulic valve. An oblique position of the support element can thus be set to a variable extent.

In an expedient embodiment an increase of pressure in the cylinder chamber of the first piston cylinder unit is followed by a reduction in pressure in the cylinder chamber of the second piston cylinder unit. Analogously, a decrease of pressure in the cylinder chamber of the first piston cylinder unit is followed by an increase in pressure in the cylinder chamber of the second piston cylinder unit. In this way the situation is obtained in that the support element moves uniformly into an inclined position, whereby for an outward deflection of the first end of the support element, which is joined to the first cylinder unit, an inward deflection at the other end of the support element occurs due to the second piston cylinder unit.

Preferably, each of the piston cylinder units comprises a piston rod which engages the support element at the side. The piston rod can transfer a movement to the support element, whereby a movement of the piston rod for the outward deflection of a first end of the support element leads to a movement of the other piston rod, which causes an inward deflection of the other end of the support element.

In addition, the piston cylinder unit can comprise a piston with a piston area, whereby the piston can be arranged displaceably in the piston cylinder unit. Hydraulic forces can be directly transferred to the piston rod by the piston.

In an expedient embodiment the piston areas are connected to the pressure source by a controllable pressure line, whereby the pressures applied to the piston areas can be identical. Here, the tensioning force is given by the area ratios of the pistons in the hydraulic cylinders.

Preferably, the pressure on the piston areas can be adjusted steplessly or in various pressure steps, whereby one step can be without pressure. In this way adjustment of the conveyor belt tension is possible dependent on operation.

A control device with a sensor for acquisition of the position of the belt can be provided for the piston cylinder unit. In this way the position of the conveyor belt can be called up during operation.

Preferably, the piston cylinder unit comprises a displacement measurement system to monitor an angular position of the support element. Thus, the situation is avoided where the support element assumes an excessively extreme inclined position.

As already mentioned above, with the belt conveyor device according to the invention the belt run or the belt tension can be automatically controlled depending on the operating situation. In addition, the belt tension can be controlled depending on measurement of the slip. Preferably, the belt conveyor device offers the possibility of a rotational speed comparison between the deflection drum and the driving drum or between the driving drum and the conveyor belt. In this way the slip of the conveyor belt can be measured, resulting in the closed-loop control of the conveyor belt tension.

Preferably, the piston and rod side can be used for tensioning the driving drum or for steering the belt run. During the belt running control the tension force is constant.

In an expedient embodiment the width of the driving drum is smaller or equal to the conveyor belt width. Soiling of the surface of the driving drum is thus not possible.

Preferably, a defined normal position of the piston of the piston cylinder unit is approximately ⅔ of the maximum extended position.

For acquiring the conveyor belt tension or the conveyor belt run a mechanical, optical, capacitive or different type of electrical sensor can be used or the sensor can determine the position of the belt by means of ultrasound.

In a further expedient embodiment all pressure lines are provided with a pressure limiting device. In this way an excessively large tension force is prevented from acting on the conveyor belt.

BRIEF DESCRIPTION OF THE DRAWING

FIG. 1 shows a schematic plan view of the belt conveyor device according to the invention.

FIG. 1 shows a belt conveyor device 1 as used with chargers and road finishers. The belt conveyor device 1 can be used to transport viscous mix material to the paving site. On road finishers and chargers conveyor systems are difficult to access. To adjust or clean the conveyor systems a huge effort is necessary due to difficult accessibility. With the belt conveyor device 1 the effort for maintenance and adjustment can be substantially reduced.

DETAILED DESCRIPTION OF THE INVENTION

The belt conveyor device 1 comprises a conveyor belt 2 to which a support element 3 abuts, supported in a displaceable manner. The conveyor belt 2 can be formed from a reinforced rubber or elastomer and/or from a metal fabric. The conveyor belt 2 can have a width which is smaller than the support element 3. Alternatively however, the conveyor belt 2 can also have a width which is greater than or equal to the width of the support element 3.

The support element 3 can be formed either as a driving drum or as a usual deflection drum. The support element 3 comprises side mountings 4a, 4b on which the support element 3 is pivotably and adjustably supported. The support element is connected to a hydraulic piston cylinder unit 5, 6 through the mountings 4a, 4b. The two hydraulic piston cylinder units 5, 6 can be pressurised independently of each other, by means of which the support element 3 can be moved into an inclined position. An inclined position of the support element 3 can counteract an undesired run of the conveyor belt 2 and thus prevent the conveyor belt 2 from running off sideways from the support element 3.

The piston cylinder unit 5, 6 is connected to the support element 3 by a piston rod 7, 8. Extending or withdrawing the piston rod 7 causes a displacement or rotation of the support element 3 about the end of the piston rod 8 which is joined to the mounting 4b. Analogously, extending or withdrawing the piston rod 8 causes a rotation or displacement of the support element 3 about the end of the piston rod 7 which is joined to the mounting 4a.

In another embodiment extending or withdrawing the piston rod 7 causes a simultaneous extension or withdrawal of the piston rod 8. Here, the support element 3 rotates or is displaced about a rotationally symmetrical central point of the volume of the support element 3.

A cylinder 9, 10 of the piston cylinder unit 5, 6 is connected fixed to the frame of the belt conveyor device 1. Alternatively, the cylinder 9, 10 can be connected fixed to the frame of the charger or of the road finisher. In order to isolate the cylinder 9, 10 from mechanical vibrations, the cylinder 9, 10 can be connected to the frame of the belt conveyor device 1 or the frame of the road finisher or charger through a damping unit (not illustrated). Mechanical vibrations cannot then influence the run or position of the support element 3.

In the cylinder 9, 10 there is a displaceable piston 11, 12. The displaceable piston 11, 12 forms a piston area 13, 14. On the opposing side the piston 11, 12 is connected to the piston rod 7, 8. The piston 11, 12 divides the cylinder 9, 10 into the cylinder chambers 15a, 15b, 16a, 16b.

The cylinder chambers 15a, 15b are fluidically connected to a pressure source 18 through a pressure line 17. Identical pressures can act in the cylinder chambers 15a, 15b. In order to obtain an inclined position of the support element 3 the pressure in the cylinder chamber 16b is reduced through the pressure line 20. The pressure lines 19, 20 are fluidically connected to the pressure source 18. Consequently, the support element 3 takes up an inclined position in the clockwise direction. In order to counteract this inclined position the pressure in the cylinder chamber 16b is raised through the pressure line 20. Simultaneously, the pressure in the cylinder chamber 15b is reduced through the pressure line 19.

Alternatively, when the pressure fluid is forced out of one of the cylinder chambers 15a, 16a, the pressure fluid can be passed back to the pressure source 18, so that a piston movement of one piston cylinder unit 5, 6 does not cause a piston movement of the other piston cylinder unit 5, 6.

To prevent a pressure in the pressure lines 17, 19, 20 from exceeding a maximum value they each comprise a pressure monitoring unit 21. With the pressure monitoring unit 21 the pressure used for tensioning the conveyor belt 2 can be monitored. In addition, the pressure monitoring unit 21 offers a control of the pressure for the belt running control.

The belt run is measured by means of sensors 22. Here, a mechanical, optical, ultrasound-based or capacitive sensor system can be used. The sensor 22 is connected to a control unit 23 which evaluates the measurement result. The processed sensor signal is used by the control unit 23 to control the pressure source 18. The pressure source 18 can control the hydraulics based on the signal from the control unit 23. Since the sensor 22 continuously monitors the belt running, continuous supervision and closed-loop control of belt running occurs. Simultaneously, a check is made on whether the conveyor belt 2 is sufficiently tensioned.

The hydraulic piston cylinder units 5, 6 can be equipped with a displacement measurement system to monitor the tensioning displacement. In this way the belt conveyor device 1 can detect whether the support element 3 has reached an inadmissible inclined position.

If the piston rod 7, 8 is extended to obtain an inclined position of the support element 3, the weight of the support element 3 acts on the piston rod 7, 8. This stress on the piston rod 7, 8 can however have a negative effect on the guidance of the piston cylinder unit 5, 6. Consequently, in an alternative embodiment of the invention an additional guide is provided for the piston rod 7, 8 which supports the piston rod 7, 8 in the extended state. The guide comprises a ring, which surrounds the piston rod 7, 8, and a connecting link which is fastened on the frame of the belt conveyor device 1 or on the frame of the charger or road finisher.

The invention claimed is:

1. Belt conveyor device for a road finisher or charger with a conveyor belt abutting on a displaceably mounted support element, and with a first and a second hydraulic piston cylinder unit for displacing the support element, and wherein
   the first and the second hydraulic piston cylinder unit each contains a displaceably arranged piston with a rod-side piston area and a head-side piston area respectively and, each hydraulic piston cylinder unit being pressurized on both ares of the piston and independently of each other by one pressure source in order to move the support element into a selected inclined position, wherein
   the piston cylinder unit comprises a displacement measurement system to monitor an angular position of the support element, wherein the head side piston areas are connected to each other by a controllable pressure line comprising a pressure monitoring unit connected to said pressure source, and the pressure applied to the head side piston areas is identical.

2. Belt conveyor device according to claim 1, wherein the first and the second piston cylinder units engage at the side adjacent to the support element.

3. Belt conveyor device according to claim 1 wherein the first and second piston cylinder unit respectively comprise a cylinder which is supported fixed.

4. Belt conveyor device according to claim 3, wherein the cylinder comprises a cylinder chamber that is split by the piston into a rod-side cylinder chamber and a head side cylinder chamber.

5. Belt conveyor device according to claim 4, wherein the rod-side cylinder chambers are respectively connected to the pressure source by a controllable pressure line.

6. Belt conveyor device according to claim 5, wherein a pressure in the rod-side and head-side cylinder chambers is variably and independently adjustable in each cylinder with an electrically actuated hydraulic valve.

7. Belt conveyor device according to claim 5, wherein the controllable pressure line comprises a pressure monitoring unit.

8. Belt conveyor device according to claim 4, wherein an increase in pressure in the rod-side cylinder chamber of the first piston cylinder unit is followed by a reduction in pressure in the rod-side cylinder chamber of the second piston cylinder unit.

9. Belt conveyor device according to claim 4, wherein a reduction in pressure in the rod-side cylinder chamber of the first piston cylinder unit is followed by an increase in pressure in the rod-side cylinder chamber of the second piston cylinder unit.

10. Belt conveyor device according to claim 1 wherein the first and second the piston cylinder unit respectively comprise a piston rod that engages the support element at the side.

11. Belt conveyor device according to claim 10, wherein the pressure on the rod-side and head-side piston areas is adjustable continuously or in various pressure steps, and wherein one step is not pressurised.

12. Belt conveyor device according to claim 1 wherein a control device for the piston cylinder unit includes a belt position sensor.

13. Method for adjusting a belt conveyor device for a road finisher or charger having a conveyor belt configured for transporting viscous material, to which a displaceably mounted support element abuts, and a first and a second hydraulic piston cylinder unit for displacing the support element, and, each of said first and second hydraulic piston cylinder units having a piston that is pressurized on both sides of the piston and being pressurized independently of each other by a single pressure source, which is connected to a head-side piston area of the first and second hydraulic piston cylinder units by a common controllable pressure line comprising a pressure monitoring unit, and which is connected to a rod-side piston area of the first and second hydraulic piston cylinder unites by a controllable pressure line, respectively, the method comprising pressurizing the first and the second hydraulic piston cylinder units independently of each other to move the support element into a desired inclined position, measuring the displacement of at least one of the piston cylinder units to determine an angular position of the support element, and controlling tension of the conveyor belt depending on measurement of slip, and slip is measured by comparing rotational speed between a driving drum and a deflection drum or between the driving drum and the conveyor belt.

* * * * *